United States Patent [19]

Morishita et al.

[11] Patent Number: 5,086,247
[45] Date of Patent: Feb. 4, 1992

[54] ARMATURE

[75] Inventors: Akira Morishita; Keiichi Konishi, both of Hyogo, Japan

[73] Assignee: Mitsubishi Denki Kabushiki Kaisha, Tokyo, Japan

[21] Appl. No.: 432,303

[22] Filed: Nov. 1, 1989

Related U.S. Application Data

[63] Continuation of Ser. No. 172,527, Mar. 24, 1988, abandoned.

[30] Foreign Application Priority Data

Apr. 10, 1987 [JP] Japan .................................. 62-54988

[51] Int. Cl.$^5$ ............................................. H02K 3/46
[52] U.S. Cl. ........................................ 310/270; 310/42; 310/45; 310/261; 310/270
[58] Field of Search ................. 310/260, 270, 271, 91, 310/42, 261, 262, 195, 208; 336/43, 45, 197; 29/598

[56] References Cited

U.S. PATENT DOCUMENTS

3,509,621  5/1970  Honsinger et al. ................. 310/260

FOREIGN PATENT DOCUMENTS

| 0164722 | 5/1949 | Austria | 310/270 |
| 0438472 | 6/1967 | Switzerland | 310/270 |
| 0792488 | 12/1980 | U.S.S.R. | 310/270 |
| 0792489 | 12/1980 | U.S.S.R. | 310/270 |

OTHER PUBLICATIONS

177 USPQ 523 in Re LUCK and GAINER No. 8842; Decision 04/26/73; C.C.P.A.
412 Federal Reporter 2d Series, A. L. Garnero Decision of 06/26/69; C.C.P.A.
726 Federal Reporter, 2d. 1565, Fromson Advance Offset Plate, Inc.; Decision of 11/08/83; U.S.C.A.F.C.
496 Federal Reporter, 2d, Series, J. H. Hughes 9137, Decision of 06/06/74; C.C.P.A.
215 USPQ 237 in Re Certain Steel Rod Treating Apparatus, 337-TA-97, Decision of 12/10/81; U.S.I.T.C.

*Primary Examiner*—R. Skudy
*Attorney, Agent, or Firm*—Sughrue, Mion, Zinn, Macpeak and Seas

[57] ABSTRACT

An armature of an electric motor, having an armature core and an armature coil wound thereon, comprises a steel ring fitted on the armature coil for preventing the armature coil from being scattered by centrifugal force applied thereto during rotation of the motor, the steel ring having a coating of insulating material and adapted to be fitted on the armature coil directly.

2 Claims, 1 Drawing Sheet

ARMATURE

This is a continuation of application Ser. No. 07/172,527, filed Mar. 24, 1988.

BACKGROUND OF THE INVENTION

The present invention relates to an armature of an electric motor such as an engine starter motor having an armature core and an armature coil wound thereon.

An example of a conventional armature of such motor is shown in FIGS. 2 and 3, in which an armature 1 includes an armature core 2 and an armature coil 3 wound thereon and is supported by a motor shaft 4 on which a commutator 5 is provided. A pair of steel rings 6 are fitted on an outer periphery of the armature coil 3, at opposite ends thereof through insulating tape 7.

In the conventional armature constructed as above, the steel rings 6 function to prevent the armature coil 3 from being radially outwardly scattered by centrifugal force applied thereto when the motor rotates. In order to electrically insulate the armature coil 3 from each steel ring 6, the insulating tape 7 is disposed therebetween.

The insulating tape 7 is wound on the outer periphery of the armature coil 3, which requires a time consuming work, practically.

SUMMARY OF THE INVENTION

An object of the present invention is to remove such time consuming work to thereby reduce a manufacturing cost of an armature of an electric motor.

The above object is achieved according to the present invention by coating a steel ring with an electrically insulative material.

DETAILED DESCRIPTION OF THE PREFERRED EMBODIMENT

Figure 1:
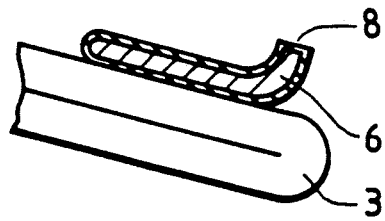
FIG. 1 is an enlarged side view of a main portion of an armature coil of an armature according to the present invention.
Figure 2:
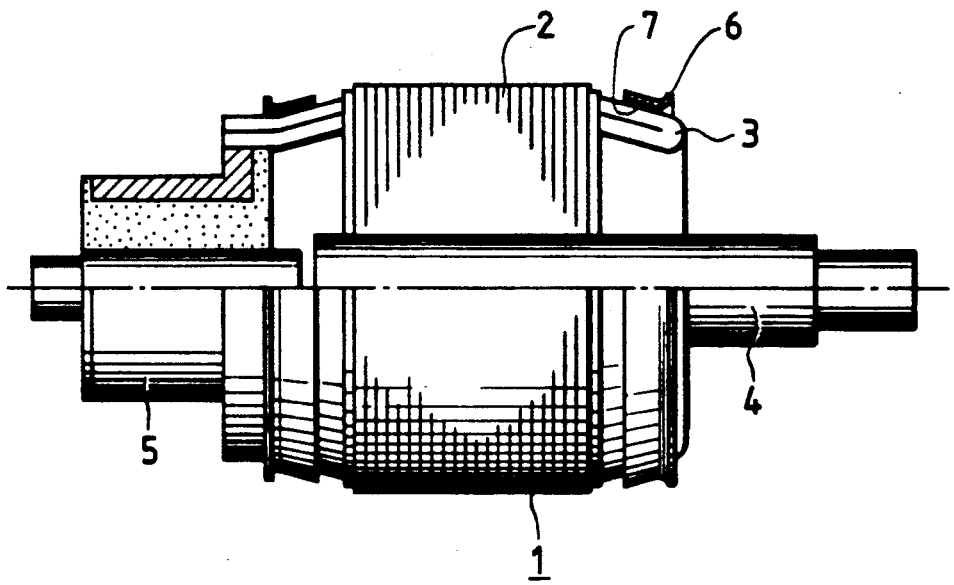
FIG. 2 is a partially cross sectioned side view of a conventional armature.
Figure 3:
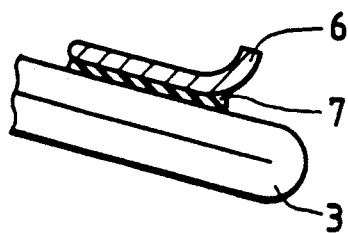
FIG. 3 is an enlarged side view of a main portion of the conventional armature shown in FIG. 2.

In FIG. 1 which shows an embodiment of the present invention applied to an armature which is basically the same as the conventional armature shown in FIG. 2, each steel ring 6 fitted on an outer periphery of an armature coil 3 on an armature 1 has a coating 8 of electrically insulative material completely surrounding the ring 6. The electrical insulation of the armature coil 3 from the steel rings 6 is provided by a portion of the insulative coating 8 of the steel rings 6 which is disposed or fitted therebetween.

Therefore, the winding step of the insulating tape with respect to the armature coil is removed and it is enough to merely fit the coated steel rings 6 on the armature coil, resulting in a practically considerable improvement on manufacturing of the armature.

When the insulating material forming the coating 8 is selected suitably, the mechanical strength of the steel ring can be improved. That is, when the coating 8 is of a suitable resin material which is mechanically tough, the mechanical strength of the steel ring is totally improved or the steel ring may be made thinner.

What is claimed is:

1. An electric motor armature including a core (2) and a coil (3) wound thereon with axially outwardly extending opposite end turns, comprising: a pair of pre-insulated steel reinforcing rings (6) individually fitted around said opposite end turns of the coil for preventing said coil from being radially outwardly scattered by centrifugal force applied thereto during rotation of said armature, said steel reinforcing rings being completely surrounded and enclosed by a coating of insulating material (8) applied thereto before fitting of said rings around said coil such that said fitting is simplified.

2. The armature as claimed in claim 1, wherein said insulating material is a synthetic resin having a mechanical strength large enough to improve mechanical properties of said steel reinforcing rings.